(12) United States Patent
Shoji (10) Patent No.: US 8,472,880 B2
(45) Date of Patent: Jun. 25, 2013

(54) WIRELESS COMMUNICATION APPARATUS AND INDICATING METHOD

(75) Inventor: Takahiro Shoji, Fukuoka (JP)

(73) Assignee: Panasonic Corporation, Osaka (JP)

( * ) Notice: Subject to any disclaimer, the term of this patent is extended or adjusted under 35 U.S.C. 154(b) by 771 days.

(21) Appl. No.: 12/499,774

(22) Filed: Jul. 8, 2009

(65) Prior Publication Data

US 2010/0009637 A1 Jan. 14, 2010

(30) Foreign Application Priority Data

Jul. 9, 2008 (JP) ................................. 2008-178828

(51) Int. Cl.
*H04B 17/00* (2006.01)
(52) U.S. Cl.
USPC ........ 455/67.1; 455/9; 455/67.11; 455/67.14; 455/143; 455/449; 455/16; 455/115; 455/226
(58) Field of Classification Search
None
See application file for complete search history.

(56) References Cited

U.S. PATENT DOCUMENTS

| | | | |
|---|---|---|---|
| 4,603,325 A * | 7/1986 | Marino et al. ........... | 340/539.21 |
| 6,141,560 A | 10/2000 | Gillig | |
| 7,024,162 B2 * | 4/2006 | Muthuswamy et al. ... | 455/67.11 |
| 7,203,487 B2 | 4/2007 | Comp | |
| 2004/0155773 A1 * | 8/2004 | Russell et al. ........... | 340/539.21 |
| 2004/0166811 A1 * | 8/2004 | Moon ......................... | 455/67.11 |
| 2004/0203433 A1 * | 10/2004 | Najafi et al. .............. | 455/67.11 |
| 2006/0030270 A1 | 2/2006 | Cheng | |
| 2007/0202913 A1 * | 8/2007 | Ban .............................. | 455/522 |
| 2008/0009324 A1 | 1/2008 | Patel | |
| 2009/0042596 A1 * | 2/2009 | Yavuz et al. .................. | 455/522 |
| 2011/0045779 A1 * | 2/2011 | Ito ................................ | 455/67.7 |

FOREIGN PATENT DOCUMENTS

JP 2002/374574 12/2002

OTHER PUBLICATIONS

International Search Report dated Oct. 19, 2009.

* cited by examiner

*Primary Examiner* — Fayyaz Alam
*Assistant Examiner* — Mohammed Rachedine
(74) *Attorney, Agent, or Firm* — Dickinson Wright PLLC

(57) ABSTRACT

A wireless communication apparatus includes: a first unit which is connected in wireless to a base station by radio wave, and which includes: a measuring unit which measures a reception electric field strength of the radio wave in the first unit transmitted from the base station to the first unit; and a transmitter which transmits information of the reception electric field strength measured by the measuring unit; and a second unit which is connected to the first unit, and which includes: a receiver which receives the information of the reception electric field strength transmitted by the transmitter; and a first indicator which indicates on the second unit the information of the reception electric field strength received by the receiver.

18 Claims, 6 Drawing Sheets

WIRELESS COMMUNICATION APPARATUS AND INDICATING METHOD

BACKGROUND

1. Field of the Invention

The present invention is related to a wireless communication apparatus and an electric field strength indicating method. More specifically, the present invention is related to such a wireless communication apparatus connected to a wireless communication base station in wireless, which indicates electric field strengths of wireless waves received from the wireless communication base station, and also, related to an electric field strength indicating method for indicating the reception electric field strengths.

2. Description of the Related Art

In telephone systems capable of executing voice communications and data communications, such services which are generally referred to as "cellulars" have been provided which utilize wireless communication systems known as GSM, cdma, PHS, and W-CDMA systems.

In wireless communication terminals such as portable telephones, as described in JP-A-2002-374574, reception electric field strengths of electromagnetic waves are indicated in general, so that users can recognize electric field strengths indicated in the wireless communication terminals. As a consequence, if electric field strengths are low, then the users move to such places where electric field strengths are high while checking electric field strengths, and thereafter, the users operate the wireless communication terminals at the above-explained places, so that communication qualities can be maintained.

Also, among cordless telephone apparatuses including cordless telephone master units and cordless telephone slave units, such cordless telephone apparatuses that cordless telephone master units are connected to public networks in wireless communication have also been utilized.

Since the above-described cordless telephone apparatuses employ such connection modes that the cordless telephone master units are not connected to the public networks in wired connection, but are connected to the public networks in wireless, the above-described connection modes have the below-mentioned merit: that is, when fixing type telephones are operated within such regional areas that wired telephone networks have not yet been provided, costs for providing infrastructures in order to construct the wired telephone networks can be reduced.

Even in the case that such cordless telephone apparatuses are employed, if reception electric field strengths of waves are indicated on cordless telephone master units, then users can set the cordless telephone master units at places within user homes where better conditions of waves are achieved so as to operate the cordless telephone master units by confirming the indicated reception electric field strengths.

However, if communication qualities are deteriorated while the users operate cordless telephone slave units at places located far from the cordless telephone master units, then the below-mentioned problems may occur: that is, the users cannot judge whether the reception electric field strengths of the waves transmitted from the cordless telephone master units with respect to the cordless telephone slave units are deteriorated, or the reception electric field strengths of the waves received by the cordless telephone master units are deteriorated.

SUMMARY

The present invention has been made of the above-described problems, and has an object to provide a wireless communication apparatus and an electric field strength indicating method, by which reception electric field strengths of the wireless communication apparatus can be readily confirmed.

According to the invention, there is provided a wireless communication apparatus including: a first unit which is connected in wireless to a base station by radio wave, and which includes: a measuring unit which measures a reception electric field strength of the radio wave in the first unit transmitted from the base station to the first unit; and a transmitter which transmits information of the reception electric field strength measured by the measuring unit; and a second unit which is connected to the first unit, and which includes, a receiver which receives the information of the reception electric field strength transmitted by the transmitter; and a first indicator which indicates on the second unit the information of the reception electric field strength received by the receiver.

In accordance with the wireless communication apparatus of the present invention, since the reception electric field of the radio wave transmitted from the base station and received by the first unit is indicated on the second unit, the reception electric field strength can be easily confirmed.

DETAILED DESCRIPTION

Referring now to first to third exemplary embodiments, a description is made of concrete contents of the present invention.

First Embodiment

Figure 1:
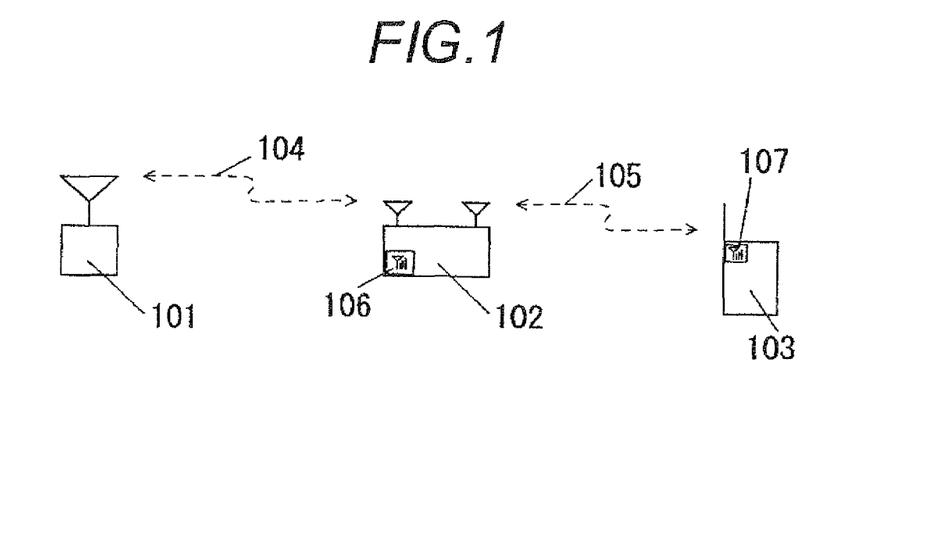
FIG. 1 is a structural diagram for showing a wireless communication cordless telephone system according to a first embodiment of the present invention.

FIG. 1 is a structural diagram for showing a system of a wireless communication cordless telephone system according to a first embodiment of the present invention.

In the wireless communication cordless system according to the embodiment, a wireless communication base station (will be referred to as "base station" hereinafter) 101 is provided. A wireless communication cordless telephone apparatus includes a wireless communication cordless telephone master unit (will be referred to as "master unit" or "first unit" hereinafter) 102 and a wireless communication cordless telephone slave unit (will be referred to as "slave unit" or "second unit" hereinafter) 103.

The base station 101 is connected to a public network (not shown), and constructs a communication area which is defined from several km to several tens km and is referred to as a "macro-cell." The base station 101 executes wireless communications such as voice and data communications with a plurality of wireless communication terminal apparatuses which are located within the above-described communication area based upon such a wireless communication system as GSM, cdma, and other systems. The master unit 102 is one of the plurality of wireless communication terminal apparatuses which are located with the above-explained communication area, and the master unit 101 is connected to the base station 101 via the public network by transmitting and/or receiving voice and data by utilizing radio wave 104.

The master unit 102 includes a reception electric field strength indicator 104 for indicating thereon reception electric field strengths of the radio wave 104 received from the base station 101

The master unit 102 is set and operated at a semi-fixed position, where a reception environment of waves received from the base station 101 becomes better. To this end, first of all, when a user operates the master unit 102, the user sets the master unit 102 at such a position that the superior reception environment is achieved while the user confirms reception electric field strengths of the radio wave 104 received from the base station 101 by confirming a reception electric field strength indicator (first indicator 106. Then, in such a case that the reception environment changes, and thus, the reception electric field strength is lowered, the user moves the master unit 102 to a position where the reception environment becomes better while the user confirms reception electric field strengths by the reception electric field indicator 106.

Also, the master unit 102 constructs a communication area which is defined from several m (meters) to several tens m (meters) and is called as a "micro-cell" by utilizing a communication system such as DECT, wireless LAN, Bluetooth (registered trademark), and other systems. The master unit 102 performs a wireless communication with the slave unit 103 which is located with the above-described communication area by using radio wave 105. Although plural sets of the above-explained slave units 103 may be connected to one set of the above-described master unit 102, for the sake of convenience, the below-mentioned description is made that a single set of the slave unit 103 is connectable to a single set of the master unit 102.

The slave unit 103 transmits and/or receives voice and data with respect to the master unit 102. Furthermore, the slave unit 103 includes a reception electric field strength indicator (first indicator) 107, while the reception electric field strength indicator 107 indicates thereon the reception electric field strength of the radio wave 104 received from the base station 101, which have been measured by the master unit 102. As a result, even if the user does not view the reception electric field strength indicator 106 of the master unit 102, the user can confirm the reception electric field strength of the radio wave 104 of the master unit 102 by merely viewing the reception electric field strength indicator 107 of the slave unit 103.

The slave unit 103 may be used not only in the same room as the master unit 102, but also in another room different from the room used for the master unit 102. When a reception environment is deteriorated while the slave unit 103 is operated by the user, the following situations may be conceived: That is, the reception electric field strength of the radio wave 105 received by the slave unit 103 is low, or the reception electric field strength of the radio wave 104 received by the master unit 102 is low. Nevertheless, even if the user need not move to the setting place of the master unit 102, the user can confirm the reception electric field strength of the radio wave 104 of the master unit 102 by viewing the reception electric field strength indicator 107. As a result of confirming a reception electric field strength of the radio wave 104 of the master unit 102, if a reception environment of the master unit 102 is good, then the user can recognize that the slave unit 103 is moved to a position where the reception environment thereof is good, since the reception electric field strength of the radio wave 105 of the child 103. On the other hand, if a reception environment of the master unit 102 is not good, then the user can understood that the master unit 102 is required to be moved.

As mentioned above and in FIG. 1, the master unit 102 is set at a semi-fixed position, and the slave unit 103 is not set at a fixed position. Alternatively, the master unit 102 may be set at a non-fixed position. That is, as far as the master unit 102 communicates with the base station 101, and the slave unit 103 communicates with the master unit 102, the master and slave units 102, 103 can vary in shape, arrangement position or the like. Further, in this embodiment, the connection of the slave unit 103 with the master unit 102 is not always done in wireless via the radio wave 105. Alternatively, the wired connection may be done instead.

Figure 2:
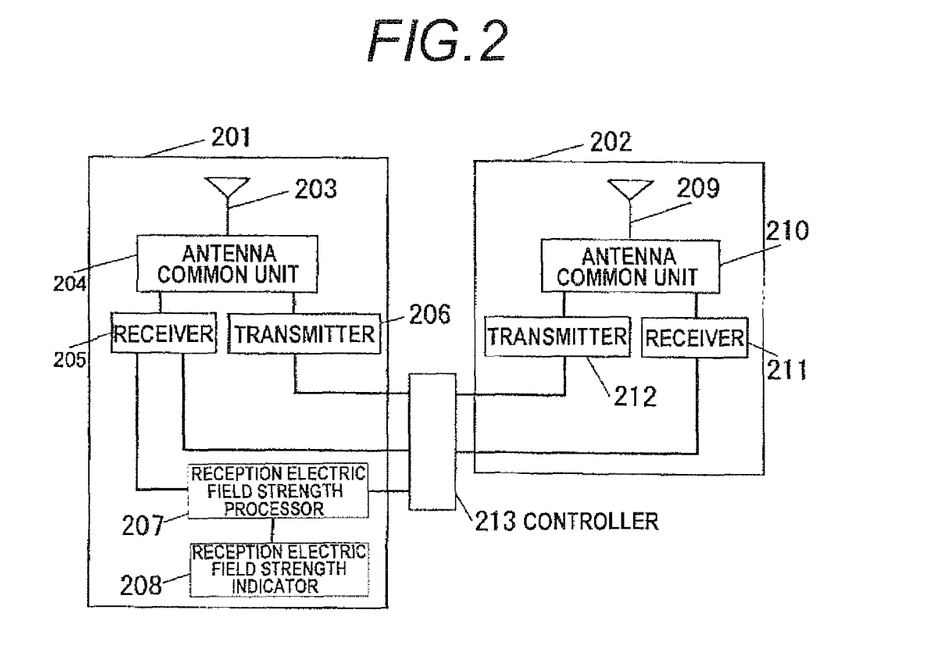
FIG. 2 is a block diagram for indicating a master unit of the wireless communication cordless telephone system of FIG. 1.

FIG. 2 is a block diagram for showing an internal arrangement of the master unit 102 of FIG. 1.

The master unit 102 is mainly arranged by a macro-cell communication unit 201, a micro-cell communication unit 202, and a controller 213. The macro-cell communication unit 201 performs a wireless communication with the base station 101. The micro-cell communication unit 202 performs a wireless communication with the slave unit 103. The controller 213 controls the macro-cell communication unit 201 and the micro-cell communication unit 202.

The macro-cell communication unit 201 is arranged by an antenna unit 203, an antenna common unit 204, a receiver 205, a transmitter 206, an electric field strength processor 207, and a reception electric field strength indicator 208.

The antenna unit 203 performs wireless transmitting/receiving operations with respect to the base station 101. The antenna common unit 204 has a function capable of separating a transmission signal and a reception signal from each other in order that the wireless transmitting operation and the wireless receiving operation are carried out by the antenna unit 203 by employing a single antenna. The receiver 205 performs a receiving process operation (demodulating process operation, decoding process operation etc.) with respect to a control signal, voice/text data, and the like, which are transmitted from the base station 101. The transmitter 206 executes a transmitting process operation (coding process operation, modulating process operation etc.) with respect to the control signal, the voice/text data, and the like. The electric field strength processor 207 and the reception electric field strength indicator 208 will be discussed later.

On the other hand, the micro-cell communication unit 202 is arranged by an antenna unit 209, an antenna common unit 210, a receiver 211, and a transmitter 212.

The antenna unit 209 performs wireless transmitting/receiving operations with respect to the slave unit 103. The antenna common unit 210 has a function capable of separating a transmission signal and a reception signal from each other in order that the wireless transmitting operation and the wireless receiving operation are carried out by the antenna unit 209 by employing a single antenna. The receiver 211 performs a receiving process operation (demodulating process operation, decoding process operation etc.) with respect to a control signal, voice/text data, and the like, which are transmitted from the slave unit 103. The transmitter 212 executes a transmitting process operation (coding process operation, modulating process operation etc.) with respect to the control signal, the voice/text data, and the like.

The controller 213 has the below-mentioned functions: That is, the controller 213 controls the respective functional blocks of the macro-cell communication unit 201 and the micro-cell communication unit 202; the controller 203 converts data received by the macro-cell communication unit 201 into a predetermined data format, and then, sends the format-converted data to the micro-cell controller 202; and conversely, the controller 203 converts data received by the micro-cell communication unit 202 into a predetermined data format, and then, sends the format-converted data to the macro-cell communication unit 201.

Next, a description is made of such a flow operation that data is transmitted from the base station 101 via the master unit 102 to the slave unit 103.

A wireless signal containing voice/text data transmitted from the base station 101 is received by the antenna unit 203 of the master unit 102. The received wireless signal is separated from a transmission signal which is transmitted from the antenna unit 203, and the receiver 205 performs such a receiving process operation as a demodulating process operation, a decoding process operation, or the like with respect to the reception signal so as to produce reception data. The controller 213 executes such a data format converting operation that a data length is changed, a predetermined header is applied, and the like with respect to the produced reception data so as to produce transmission data.

The transmitter 212 executes such a transmitting process operation as a coding process operation, a modulating process operation, or the like with respect to the produced transmission data. The antenna common unit 210 separates the transmission data from the reception data received by the antenna unit 209, and the antenna unit 209 transmits the transmission data to the slave unit 103 in a wireless transmission manner.

Conversely, when data is transmitted from the slave unit 103 via the master unit 102 to the base station 101, similar process operations to the above-explained process operations are carried out in accordance with flow operations defined by the antenna unit 209, the antenna common unit 210, the receiver 211, the controller 213, the transmitter 206, the antenna common unit 204, and the antenna unit 203.

Next, a description is made of control operations for indicating reception electric field strengths of signals transmitted from the base station 101 in the master unit 102.

First of all, the antenna unit 203 of the master unit 102 receives a control signal containing such a signal series, namely, a reception frequency band, reception timing, a reception data series, and the like from the base station 101. The antenna common unit 204 separates the received control signal from a signal which is transmitted by the antenna common unit 204. The receiver 205 refers to the signal series contained in the separated control signal so as to measure a reception electric field strength. This measured reception electric field strength is, for instance, such a value as −36.5 [dBm]. The reception electric field strength processor 207 judges an electric field level based upon the reception electric field strength measured by the receiver 205. This judged electric field strength level corresponds to, for example, any one of numeral values "0", "1", "2", and "3", which imply that each of the reception electric field strengths indicates any one of "out of service area", "weak", "medium", and "strong." The reception electric field strength indicator 208 corresponds to the reception electric field strength indicator 106 of FIG. 1, and indicates such a reception electric field strength in response to an electric field strength level judged by the reception electric field strength processor 207. As represented in FIG. 1, the reception electric field strength indicator 208 indicates electric field strengths based upon a total number of antennas. The quantities "1", "2", and "3" of antennas indicate that the reception electric field strengths correspond to "weak", "medium", and "strong", respectively. When a reception electric field strength corresponds to "out of service area", this reception electric field strength is indicated by using such a character of "out of service area."

The controller 213 superimposes information as to the reception electric field strength containing the judgment results made by the reception electric field strength processor 207 on a transmission signal directed to the slave unit 103, and then, transmits the superimposed transmission signal via the transmitter 212, the antenna common unit 210, and the antenna unit 209 to the slave unit 103.

Figure 3:
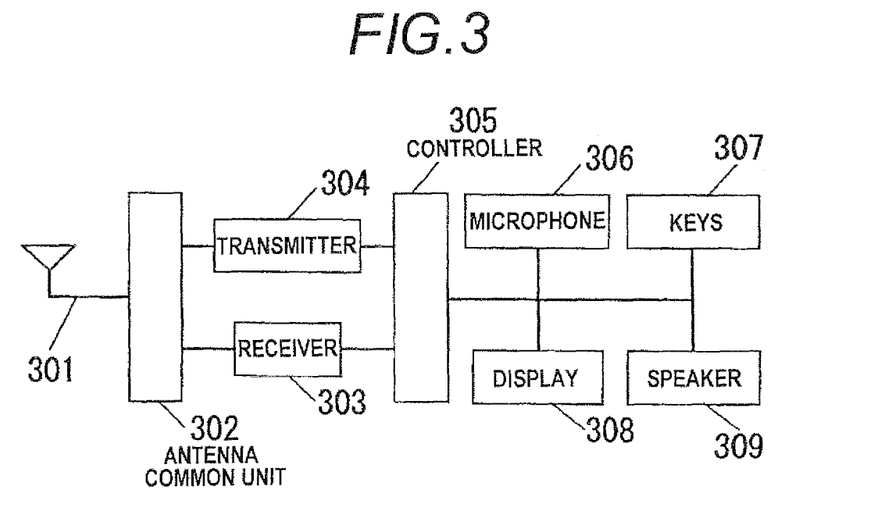
FIG. 3 is a block diagram for representing a slave unit of the wireless communication cordless telephone system of FIG. 1.

FIG. 3 is a block diagram for showing an internal arrangement of the slave unit 103 of FIG. 1.

The slave unit 103 is arranged by a micro-cell wireless transmitting/receiving antenna unit 301, an antenna common unit 302, a receiver 303, a transmitter 304, a controller 305, a microphone 306, keys 307, an display 308, and a speaker 309.

The antenna unit 301 performs wireless transmitting/receiving operations with respect to the master unit 102. The antenna common unit 302 has a function capable of separating a transmission signal and a reception signal from each other in order that the wireless transmitting operation and the wireless receiving operation are carried out by the antenna unit 203 by employing a single antenna. The receiver 304 performs a receiving process operation (demodulating process operation, decoding process operation etc.) with respect to a control signal, voice/text data, and the like, which are transmitted from the master unit 102. The transmitter 304 executes a transmitting process operation (coding process operation, modulating process operation etc.) with respect to the control signal, the voice/text data, and the like.

The controller 305 executes a predetermined process operation with respect to received voice/text data and the like so as to display a text on the display 308 and to output voice from the speaker 309. Also, the controller 305 executes a predetermined process operation with respect to voice inputted from the microphone 306, a text entered by operating the keys 307, and the like.

When the antenna unit 301 receives voice/text data from the master unit 102, the antenna common unit 302 separates the received voice signal and the received text information from a transmission signal which is transmitted from the antenna unit 301, and the receiver 303 performs such a receiving process operation as a demodulating process operation, a decoding process operation, and the like with respect to the reception signals so as to produce reception data such as a voice signal, text information, and the like. The speaker 309 outputs voice from the voice signal, and the display 308 outputs a text from the text information.

Also, the controller 305 performs a predetermined process operation with respect to the voice entered from the microphone 306 and the text entered by operating the keys 307 so as to produce transmission data, and then, the transmitter 304 performs such a process operation as a coding process operation, a modulating process operation, and the like with respect to the produced transmission data. The antenna common unit 302 separates the transmission data from the reception data received by the antenna unit 301, and the antenna unit 301 transmits the transmission data to the master unit 102.

Also, the controller 305 performs a predetermined process operation with respect to information as to a reception electric field strength of radio wave 104 transmitted from the master unit 102. While the display 308 contains the reception electric field strength indicator 107 shown in FIG. 1, the display 308 displays thereon the reception electric field strength of the radio wave 104.

Figure 8:
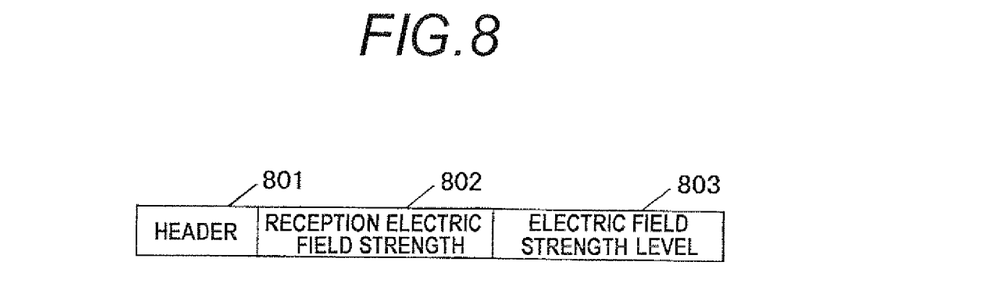
FIG. 8 is a schematic diagram for showing a transmission data format of reception electric field strength information.

FIG. 8 is a schematic diagram for representing a data format of information as to information of a reception electric field strength, which is transmitted from the master unit 102 to the slave unit 103.

The information includes a header portion 801 into which general-purpose header information required in a wireless communication.

The information also includes a value of such a reception electric field strength measured by the master unit 102. The information also includes an electric field strength level 803, namely, an electric field strength level which is calculated from the reception electric field strength measured by the master unit 102. The slave unit 103 can indicate the same electric field strength as that of the master unit 102 by employing the received electric field strength level 803. Also, the slave unit 103 can indicate such a specific reception electric field strength which is different from that of the master unit 102 by utilizing the reception electric field strength 802 received by the slave unit 103.

The information of the reception electric field strength may contain either one of the value of the reception electric field strength 802 and the electric field strength level 803. In a case where the value of the reception electric field strength 802 is transmitted to the slave unit 103; the slave unit 103 can display or indicate such a specific reception electric field strength which is different from that of the master unit 102 as mentioned above. In a case where the reception electric field strength level 803 is transmitted to the slave unit 103, the judgment of the reception electric field strength level 803 at a slave unit side can be omitted.

Second Embodiment

Figure 4:
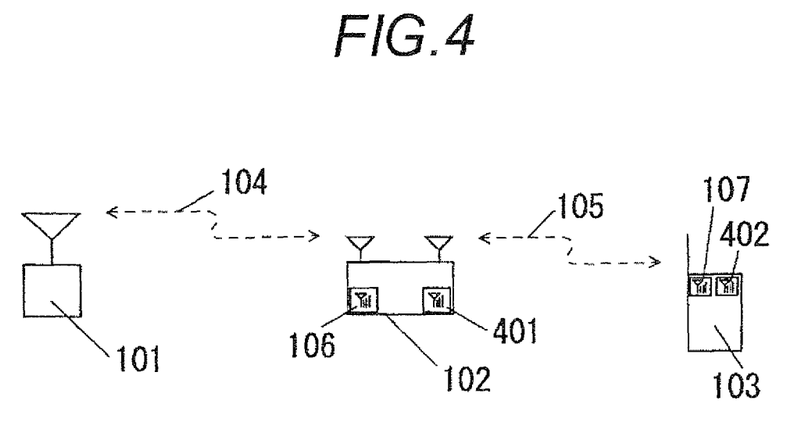
FIG. 4 is a structural diagram for showing a wireless communication cordless telephone system according to a second embodiment of the present invention.

FIG. 4 is a structural diagram for showing a wireless communication cordless telephone system according to a second embodiment of the present invention. It should be understood that the same reference numerals shown in FIG. 1 will be employed as those for denoting the same structural units of FIG. 4.

In the slave unit 103 of FIG. 4, a reception electric field strength of radio wave 105 measured by the slave unit 103 is indicated in a reception electric field strength indicator 402 in addition to the reception electric field strength indicator 107 which indicates a reception electric field strength of radio wave 104.

In order to secure a superior communication environment by employing the slave unit 103, both a reception electric field strength of radio wave 104 received from the base station 101 in the master unit 102, and a reception electric field strength of radio wave 105 received from the master unit 102 in the slave unit 103 must satisfy a constant level. As a consequence, since both the reception electric field strength of the radio wave 104 and the reception electric field strength of the radio wave 105 are indicated in the slave unit 103, when the master unit 102 is set, communication environments of both the master unit 102 and the slave unit 103 can be confirmed.

Similar to the slave unit 103, also, in the master unit 102 of FIG. 4, a reception electric field strength of radio wave 105 measured by the slave unit 103 is indicated on a reception electric field strength indicator 401 in addition to the reception electric field strength indicator 106 which indicates thereon a reception electric field strength of radio wave 104.

As a result, when a normal voice communication and a normal data communication are carried out, both communication environments as to a macro-cell wireless communication and a micro-cell wireless communication can be confirmed.

Figure 6:
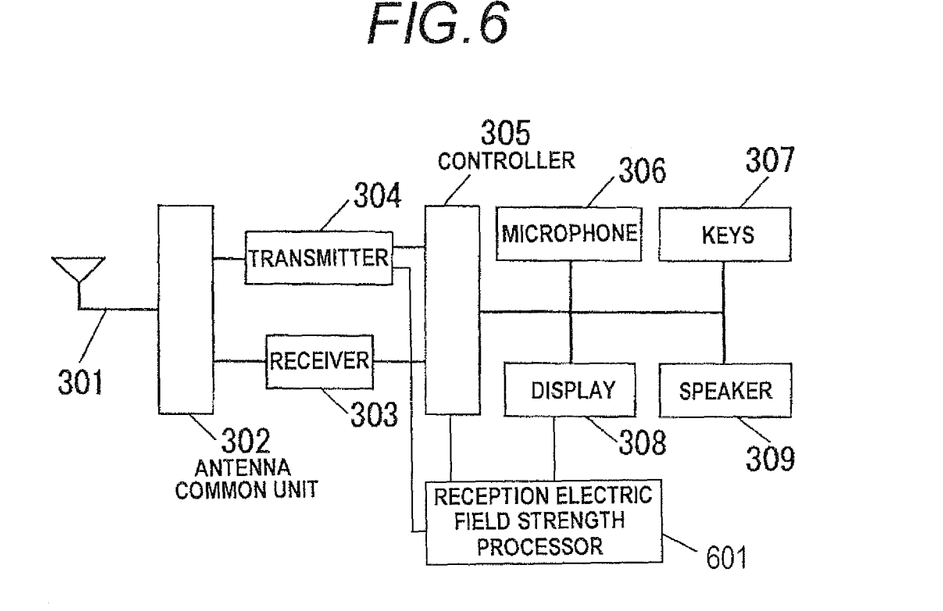
FIG. 6 is a block diagram for representing a slave unit of the wireless communication cordless telephone system of FIG. 4.

FIG. 6 is a block diagram for showing an internal arrangement of the slave unit 103 of the wireless communication cordless telephone system shown in FIG. 4. It should also be noted that the same reference numerals shown in FIG. 3 will be employed as those for indicating the same structural units indicated in FIG. 6.

The slave unit 103 includes a reception electric field strength processor 601.

First of all, the antenna unit 301 receives a control signal from the master unit 102, on which the signal known in the technical field has been superimposed. The antenna common unit 302 separates the received control signal from transmission data, and the receiver 303 measures a reception electric field strength based upon the known signal contained in the received control signal. This measured reception electric field strength is, for instance, such a value as −36.5 [dBm]. The reception electric field strength processor 601 judges an electric field level based upon the reception electric field strength measured by the receiver 303. This judged electric field strength level corresponds to, for example, any one of numeral values "0", "1", "2", and "3", which imply that each of the reception electric field strengths indicates any one of "out of service area", "weak", "medium", and "strong." The display 308 indicates thereon such a reception electric field strength in response to an electric field strength level judged by the reception electric field strength processor 601. As represented in FIG. 4, the display 308 indicates electric field strengths based upon a total number of antennas, while the display 308 contains a reception electric field strength indicator 402. The quantities "1", "2", and "3" of antennas indicate that the reception electric field strengths correspond to "weak", "medium", and "strong", respectively. When a reception electric field strength corresponds to "out of service area", this reception electric field strength is indicated by such a character of "out of service area."

A controller 305 superimposes information as to the reception electric field strength containing the judgment results made by the reception electric field strength processor 601 on a transmission signal directed to the master unit 102, and then, transmits the superimposed transmission signal via the transmitter 304, the antenna common unit 302, and the antenna unit 301 to the master unit 102.

Figure 5:
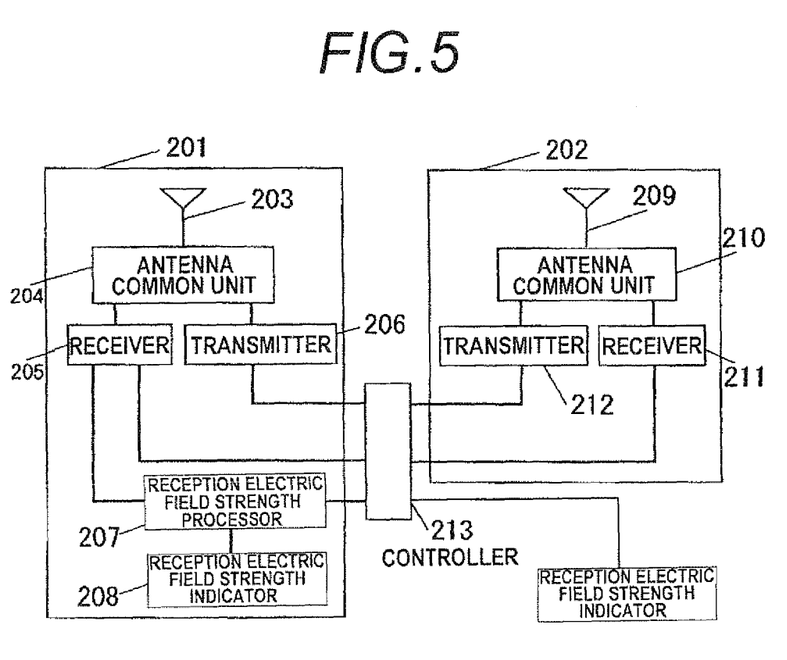
FIG. 5 is a block diagram for indicating a master unit of the wireless communication cordless telephone system of FIG. 4.

FIG. 5 is a block diagram for representing an internal arrangement of the master unit 102 shown in FIG. 4. It should also be noted that the same reference numerals indicated in FIG. 2 will be employed as those for denoting the same structural units of FIG. 5.

The master unit 102 includes a reception electric field strength indicator 501. The reception electric field strength indicator 501 corresponds to the above-explained reception electric field strength indicator 401 and indicates therein reception electric field strengths of radio wave 105.

The antenna unit 209 of the master unit 102 receives such a signal transmitted from the slave unit 103, to which the information as to the reception electric field strength of the radio wave 105 has been superimposed; the antenna common unit 210 separates the received signal from transmission data; and the receiver 211 performs a predetermined process operation with respect to the separated signal. The controller 213 causes the reception electric field strength indicator 501 to indicate thereon a reception electric field strength based upon the information as to the reception electric field strength of the radio wave 105. The information as to the reception electric field strength which is transmitted from the slave unit 103 to the master unit 102 has a similar data format to that shown in FIG. 8. In a similar manner when the display 308 of the slave unit 103 displays thereon the reception electric field strength of the radio wave 104, the reception electric field strength indicator 501 can indicate such an electric field strength identical to that of the slave unit 103 by employing the received electric field strength level, and further, can indicate a specific reception electric field strength different from that of the slave unit 103 by utilizing the received reception electric field strength.

Although the description has been made of such a case that the single slave unit 103 has been connected with respect to the master unit 102, when a plurality of slave units are under communicable condition, the controller 213 may alternatively calculate an average value of reception electric field strengths among the plural slave units, or a minimum value of the reception electric field strengths among the plural slave units based upon the reception electric field strengths which are received from the plurality of slave units, and then, may alternatively cause the reception electric field strength indicator 501 to indicate thereon the calculated value.

Third Embodiment

Although the slave unit 103 continuously indicates the reception electric field strengths of the radio wave 104 in the first and second embodiments, the slave unit 103 of a third embodiment indicates such a reception electric field strength of radio wave 104 only when this reception electric field strength becomes "out of service area."

Figure 7:
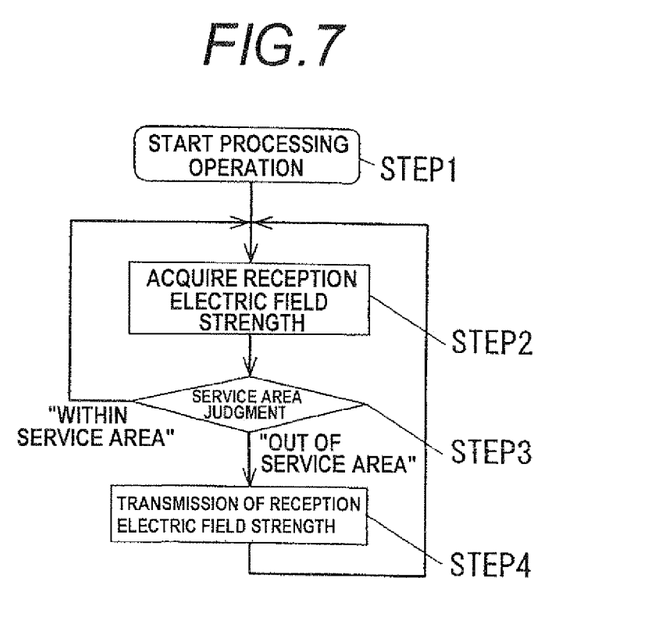
FIG. 7 is a control flowchart of a wireless communication cordless telephone system according to a third embodiment of the present invention.

FIG. 7 shows a control flowchart of a wireless communication cordless telephone system according to the third embodiment of the present invention.

When a process operation executed in the controller 213 of the master unit 102 is commenced (STEP 1), the controller 213 acquires a reception electric field strength of radio wave 104 from the reception electric field strength processor 207 (STEP 2). Next, the controller 213 compares the acquired reception electric field strength with a predetermined threshold level. In the case that the acquired reception electric field is higher than the threshold level, the controller 213 judges that this acquired reception electric field strength is "within service area." In the case that the acquired reception electric field is lower than the threshold level, the controller 213 judges that this acquired reception electric field strength is "out of service area" (STEP 3).

When the controller 213 judges that the acquired reception electric field strength is "within service area", the process operation is returned to the reception electric field strength acquiring step (STEP 2) in which the next process operation is continuously performed.

When the controller 213 judges that the acquired reception electric field strength is "lout of service area", the controller 213 further produces such a signal for indicating that the received electric field strength is "out of service area", and performs a reception electric field strength transmitting process operation (STEP 4) in order to transmit the produced signal to the slave unit 103, and thereafter, the process operation is returned to the reception electric field strength acquiring process operation (STEP 2) in which the next process operation is continuously carried out.

On the other hand, only in such a case that the acquired reception electric field strength is "out of service area", the slave unit 103 receives a reception electric field strength signal from the master unit 102, and the display 308 displays thereon such a message that the acquired reception field strength is "out of service area."

As previously described, only in such a case that the reception electric field strength has been deteriorated in the master unit 102, since the controller 213 of the master unit 102 notifies that the acquired reception electric field strength is "out of service area" to the slave unit 103, loads as to the receiving process operation given to the slave unit 103 can be reduced, so that power consumption of the slave unit 103 can be reduced.

Also, the master unit 102 itself may alternatively indicate the reception electric field strength of the radio wave 104 only in such a case that the reception electric field strength of the radio wave 104 is "out of service."

In addition, at least one of the master unit 102 and the slave unit 103 may alternatively indicate the reception electric field strength of the radio wave 104 only in such a case that the reception electric field strength of the radio wave 105 is "out of service area."

It should also be noted that the indication forms of the reception electric field strengths in the first to third embodiments are not limited only to, as represented in FIG. 1 and FIG. 4, such indications that the reception electric field strengths are indicated on mobile communication terminals by employing total quantities of antennas in a general indication manner, but also any other indicating methods may be alternatively employed. For instance, the reception electric field strengths may be alternatively indicated in different colors by operating LEDs. As one example, when a reception electric field strength is "out of service area", this reception electric field strength may be indicated in a red LED color; when a reception electric field strength is "weak reception electric field strength within service area", this reception electric field strength is indicated in a yellow LED color; when a reception electric field strength is "medium reception electric field strength within service area", this reception electric field strength is indicated in a green LED color; and when a reception electric field strength is "strong reception electric field strength within service area", this reception electric field strength is indicated in a blue LED color.

The above-described LED indication method may have such a merit: That is, there are some possibilities that such a problem may occur, for example, indications of electric field strengths are located in long distances, at which angle, the electric field strengths can be hardly viewed. In such a problem, the reception electric field strengths are indicated in different LED colors, so that the reception electric field strengths may be confirmed at first glance.

Although the master unit 102 has been connected to the slave unit 103 in the wireless manner in the first to third embodiments, the present invention is not limited only to the above-described wireless connecting manner. Alternatively, the present invention may be realized by such a wireless communication apparatus which is constituted by a master unit and a slave unit connected to the master unit in a wired manner.

Moreover, in the first to third embodiments, the master unit 102 has been constructed in such a manner that the macro-cell communication unit 201 for performing the wireless communication with the base station 101, and the micro-cell communication unit 202 for performing the wireless communication with the slave unit 103 have been formed in an integral body. However, the present invention is not limited only to the above-described connection structure. Alternatively, the master unit 102 may be realized in such a manner that the respective functions have been connected in separate bodies.

Many modifications and variations of the present invention are possible in the light of the above techniques. It is therefore to be understood that within the scope of the invention, the invention may be practiced than as specifically described. The present application is based upon and claims the benefit of priority of Japanese Patent Application No. 2008-178828 filed on Jul. 9, 2008, the contents of which are incorporated herein by reference in its entirety.

What is claimed is:

1. A wireless communication system, comprising:
a first unit configured for wireless communication via a radio wave with a base station, configured for communication with a public network through the base station; and
a second unit configured for wireless communication via a radio wave with the first unit,
wherein:
the second unit is configured for communication with a public network through the base station via the first unit, and
wherein:
the first unit includes:
a measuring unit which measures a reception electric field strength of the radio wave in the first unit transmitted from the base station to the first unit; and
a transmitter which transmits information of the reception electric field strength measured by the measuring unit to the second unit; and
the second unit includes:
a receiver which receives the information of the reception electric field strength, transmitted by the transmitter of the first unit;
a first indicator which indicates at the second unit the information of the reception, electric field strength received by the receiver of the second unit;
a second measuring unit which measures a reception electric field strength of the radio wave in the second unit transmitted from the first unit to the second unit; and
a second indicator which indicates at the second unit information of the electric field strength measured by the measuring unit of the second unit.

2. The wireless communication system as claimed in claim 1,
wherein the first unit includes a third indicator which indicates at the first unit the information of the reception electric field strength measured by the measuring unit.

3. The wireless communication system as claimed in claim 1,
wherein the second unit includes a transmitter which transmits the information of the reception electric field strength measured by the measuring unit of the second unit to the first unit, and
wherein the first unit further includes:
a receiver which receives the information of the reception electric field strength transmitted by the transmitter of the second unit; and
a fourth indicator which indicates at the first unit the information of the reception electric field strength received by the receiver of the first unit.

4. The wireless communication system as claimed in claim 1,
wherein the first indicator is adapted to make an indication in response to a level of the reception electric field strength.

5. The wireless communication system as claimed in claim 4,
wherein the level of the reception electric field strength is divided into three levels expressed by "strong", "medium", and "weak".

6. The wireless communication system as claimed in claim 5,
wherein the first indicator is adapted to graphically indicate antennas in response to the level of the reception electric field strength.

7. The wireless communication system as claimed in claim 5,
wherein the first indicator is adapted to make the indication in different colors in response to the level of the reception electric field strength.

8. The wireless communication system as claimed in claim 4,
wherein the level of the reception electric field strength includes a level of "out of service area".

9. The wireless communication system as claimed in claim 4,
wherein the first indicator is configured to make the indication only when the level of the reception electric field strength is "out of service area."

10. The wireless communication system as claimed in claim 1,
wherein the information of the reception electric field strength transmitted by the transmitter of the first unit includes a value of the reception electric field strength.

11. The wireless communication system as claimed in claim 1,
wherein the information of the reception electric field strength transmitted by the transmitter of the first unit includes a level of the reception electric field strength, which is classified based on a value of the reception electric field strength.

12. The wireless communication system as claimed in claim 1,
wherein the information of the reception electric field strength transmitted by the transmitter of the first unit includes both of a value of the reception electric field strength and a level of the reception electric field strength, which is classified based on the value of the reception electric field strength.

13. An indicating method, comprising:
measuring, in a first unit which is configured for wireless communication via a radio wave with a base station a reception electric field strength of the radio wave in the first unit transmitted from the base station, the base station being configured for communication with a public network;
transmitting information of the measured reception electric field strength to a second unit which is configured for wireless communication via a radio wave with the first unit;
receiving the information of the reception electric field strength transmitted from the first unit by the second unit;
indicating the information of the received reception electric field strength from the first unit at the second unit;
measuring, in the second unit, a reception electric field strength of the radio wave in the second unit transmitted from the first unit; and
indicating information of the measured reception electric field strength at the second unit,
wherein the second unit is configured for communication with a public network through the base station via the first unit.

14. The indicating method as claimed in claim 13,
wherein the information of the measured reception electric field strength is indicated at the first unit.

15. The indicating method as claimed in claim 13,
wherein information of the measured reception electric field strength in the second unit is transmitted to the first unit,
wherein the information of the transmitted reception electric field strength in the second unit is received by the first unit, and
wherein the information of the received reception electric field strength in the second, unit is indicated in the first unit.

16. The indicating method as claimed in claim 13,
wherein the information of the reception electric field strength transmitted from the first unit in the transmitting process includes a value of the reception electric field strength.

17. The indicating method as claimed in claim 13,
wherein the information of the reception electric field strength transmitted from the first unit in the transmitting process includes a level of the reception electric field strength, which is classified based on a value of the reception electric field strength.

18. The indicating method as claimed in claim 13,
wherein the information of the reception electric field strength transmitted from the first unit in the transmitting process includes both of a value of the reception electric field strength and a level of the reception electric field strength, which is classified based on the value of the reception electric field strength.

* * * * *